United States Patent
Nakashima et al.

(10) Patent No.: US 11,220,159 B2
(45) Date of Patent: Jan. 11, 2022

(54) WIND DIRECTION CONTROL DEVICE

(71) Applicant: HONDA MOTOR CO., LTD., Tokyo (JP)

(72) Inventors: Yu Nakashima, Wako (JP); Wataru Kimatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 16/421,736

(22) Filed: May 24, 2019

(65) Prior Publication Data

US 2019/0366801 A1    Dec. 5, 2019

(30) Foreign Application Priority Data

May 30, 2018  (JP) .............................. JP2018-103657

(51) Int. Cl.
*B60H 1/00* (2006.01)
(52) U.S. Cl.
CPC ..... *B60H 1/00871* (2013.01); *B60H 1/00021* (2013.01); *B60H 1/00842* (2013.01); *B60H 1/00985* (2013.01); *B60H 2001/00185* (2013.01)
(58) Field of Classification Search
CPC ........ B60H 1/00642; B60H 2001/3471; B60H 1/00735; B60H 1/00742; B60H 1/00871; B60H 1/00792; B60H 1/00842; B60H 1/00835
USPC .................................................... 454/75, 155
See application file for complete search history.

(56) References Cited

U.S. PATENT DOCUMENTS

| 7,018,288 | B2 * | 3/2006 | Okada .................. | B60H 1/3421 454/155 |
| 8,057,288 | B2 * | 11/2011 | Konet ................ | B60H 1/00742 454/155 |
| 8,210,913 | B2 * | 7/2012 | De Marino ........ | B60H 1/00742 454/152 |
| 2009/0318069 | A1 * | 12/2009 | Konet .................. | B60H 1/3428 454/155 |
| 2012/0291893 | A1 * | 11/2012 | Yamamoto ........... | B60H 1/3428 137/551 |
| 2014/0277936 | A1 * | 9/2014 | El Dokor ........... | G06K 9/00355 701/36 |

(Continued)

FOREIGN PATENT DOCUMENTS

| JP | H05-240497 A | 9/1993 |
| JP | 2001-287540 A | 10/2001 |

(Continued)

OTHER PUBLICATIONS

Office Action dated Oct. 8, 2021, issued in counterpart JP application No. 2018-103657, with partial English translation. (5 pages).

*Primary Examiner* — Vivek K Shirsat
*Assistant Examiner* — Ko-Wei Lin
(74) *Attorney, Agent, or Firm* — Westerman, Hattori, Daniels & Adrian, LLP

(57) ABSTRACT

According to the present invention, a wind direction control device is provided. The wind direction control device comprises a detector configured to detect a hand; a wind direction adjustment unit configured to adjust an air blowing direction of an air conditioner; and a controller configured to control the wind direction adjustment unit so that a direction of the hand detected by the detector is set as the air blowing direction.

9 Claims, 5 Drawing Sheets

(56) References Cited

U.S. PATENT DOCUMENTS

2015/0328958 A1* 11/2015 Winget, Jr. .......... B60H 1/3414
454/155
2016/0306532 A1* 10/2016 Ko ..................... G06F 3/04883
2018/0086179 A1* 3/2018 Mizuno ............. B60H 1/00871

FOREIGN PATENT DOCUMENTS

| JP | 2007-230325 A | 9/2007 |
| JP | 2016-196287 A | 11/2016 |
| JP | 2017-7431 A | 1/2017 |
| JP | 2017-121894 A | 7/2017 |

* cited by examiner

WIND DIRECTION CONTROL DEVICE

CROSS-REFERENCE TO RELATED APPLICATION(S)

This application claims priority to and the benefit of Japanese Patent Application No. 2018-103657 filed on May 30, 2018, the entire disclosure of which is incorporated herein by reference.

BACKGROUND OF THE INVENTION

Field of the Invention

The present invention relates to an air conditioning device (referred to hereinafter simply as an air conditioner), and particularly relates to a wind direction control device that controls the wind direction of the air conditioner.

Description of the Related Art

Air conditioners also include on-board air conditioners installed in vehicles. Air that is conditioned by an on-board air conditioner passes through an air passage and is blown into a vehicle cabin from a vent. A louver and a fin for adjusting the wind direction are provided in the air passage. The direction of the wind that is blown out is adjusted in a left-right direction and an up-down direction by the louver and the fin.

The wind direction is usually adjusted by manually operating operation portions that are interlocked with the louver and the fin. However, proposals have also been made in which this adjustment operation is automated or is performed remotely. For example, a proposal has been made for an on-board air conditioner that determines the positions of passengers seated on seats in the vehicle cabin and performs control so that louvers are oriented in predetermined directions, in accordance with the determined positions of the passengers (see Japanese Patent Laid-Open No. 2017-7431). Further, a proposal has also been made for an air conditioner that detects the position and movement of a hand and adjusts the wind direction in accordance with the movement if the movement corresponds to a predetermined movement pattern (see Japanese Patent Laid-Open No. 2016-196287).

In the technique disclosed in Japanese Patent Laid-Open No. 2017-7431, however, the louvers are controlled so as to be oriented in predetermined directions, and thus, the wind direction cannot be adjusted to desired directions. Further, in the technique disclosed in Japanese Patent Laid-Open No. 2016-196287, while the wind direction can be adjusted, a hand needs to be moved at predetermined positions and it is difficult to avoid complication of operations and also to make fine adjustments. Further, in order to adjust the wind direction, adjustment needs to be made with the current wind direction determined beforehand, but air is invisible, and thus, it is difficult to determine the wind direction.

SUMMARY OF THE INVENTION

The present invention provides a wind direction control device that allows adjustment to be performed remotely and as desired through an intuitive operation.

According to one aspect of the present invention, there is provided a wind direction control device that includes: a detector configured to detect a hand; a wind direction adjustment unit configured to adjust an air blowing direction of an air conditioner; and a controller configured to control the wind direction adjustment unit so that a direction of the hand detected by the detector is set as the air blowing direction.

According to the present invention, a wind direction control device that allows adjustment to be performed remotely through an intuitive operation can be provided.

Further features of the present invention will become apparent from the following description of exemplary embodiments with reference to the attached drawings.

DESCRIPTION OF THE EMBODIMENTS

First Embodiment

In the following, one embodiment of an air conditioner in the present invention, which is an on-board air conditioner, is described in particular with reference to the attached drawings. The X, Y, and Z directions used in the following description are defined as follows. The X direction is a direction (air passage direction) in which an air passage formed inside an air blowing unit extends. The +X direction is a direction in which a vent formed on the downstream side of the air passage is open. The Y direction and Z direction are perpendicular to one another and are each perpendicular to the X direction. To provide one example, if a cross-section of the air passage that is perpendicular to the X direction has a rectangular shape, the long-side direction is the Y direction and the short-side direction is the Z direction. Further, to provide one example in relation with a vehicle, the X direction is the front-rear direction of the vehicle and the +X direction is the direction from the front toward the rear of the vehicle. The Y direction is the left-right (width) direction of the vehicle and the +Y direction is the direction from the right to the left facing forward of the vehicle. The Z direction is the up-down direction of the vehicle and the +Z direction is the direction from the bottom to the top of the vehicle. In the following, left, right, front, and rear indicate directions facing forward of the vehicle. However, the X, Y, and Z directions are not limited to these examples.

Figure 1:
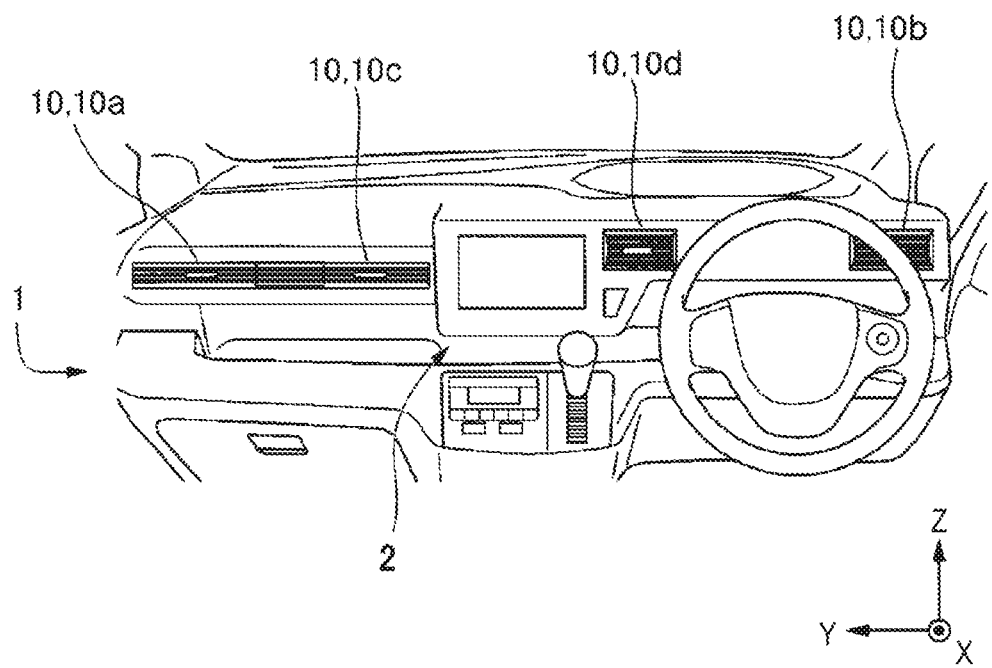
FIG. 1 is a front view of an instrument panel in a vehicle cabin.
Figure 2:
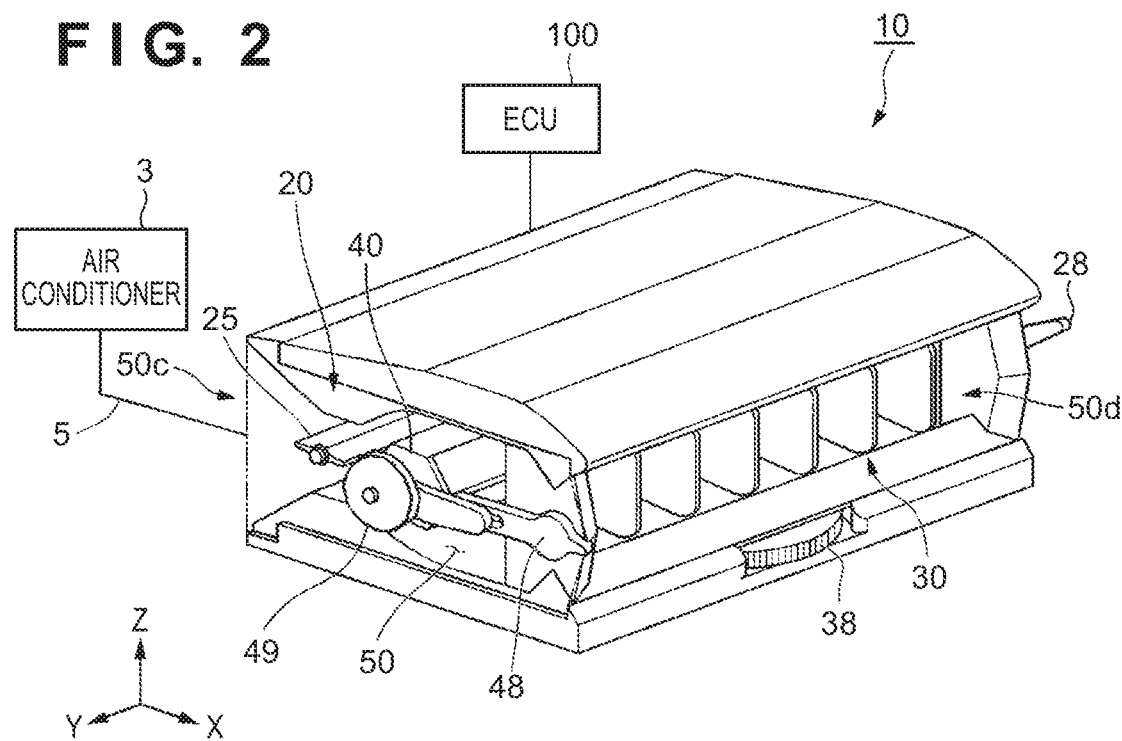
FIG. 2 is a perspective view of an air blowing unit of an air conditioner according to an embodiment.

FIG. 1 is a front view of an instrument panel 2 in a vehicle cabin 1. FIG. 2 is a perspective view of an air blowing unit in the embodiment. As illustrated in FIG. 1, air blowing units 10a and 10b are respectively provided at the left and right end portions of the instrument panel 2, and near the center of the instrument panel 2, air blowing units 10c and 10d are provided side by side, with the air blowing unit 10c on the left and the air blowing unit 10d on the right. All of the air blowing units have the same structure in the present embodiment. Accordingly, the air blowing units are referred to by using the generic term "air blowing unit 10." Further, though not illustrated, the rear seats may also be provided with air blowing units. Further, each air blowing unit 10 is provided with an unillustrated image sensor. The image sensor is provided near a vent of the air blowing unit 10, e.g., below the vent. The image sensor in the present embodiment is provided for each air blowing unit, and if a specific pattern is detected from an image acquired by the image sensor, the air blowing unit paired with the image sensor becomes an operation target. Hence, it is preferable that the angles of view of the image sensors of the air blowing units 10a and 10b be set so as not to overlap with images captured by the image sensors of the air blowing units 10c and 10d even if images of seated passengers are captured, for example. On the other hand, because the air blowing units 10c and 10d are provided close to one another, the images captured by the image sensors of the air blowing units 10c and 10d may overlap one another. Further, an indicator lamp is provided near the vent, and the indicator lamp turns on during automatic adjustment of wind direction, etc., and notifies passengers that the corresponding air blowing unit 10 is being automatically adjusted.

In FIG. 2, a +Y direction end surface of a case 20 is illustrated as being transparent to facilitate comprehension of the internal structure of the air blowing unit 10. As illustrated in FIG. 2, the vehicle is provided with an air conditioner 3. The air conditioner 3 adjusts the temperature, humidity, etc., of the air inside the vehicle cabin. The air blowing unit 10 is connected to the air conditioner 3 via a duct 5. The air that is conditioned by the air conditioner 3 is blown into the vehicle cabin from the air blowing unit 10.

Structure of Air Blowing Unit

Figure 3:
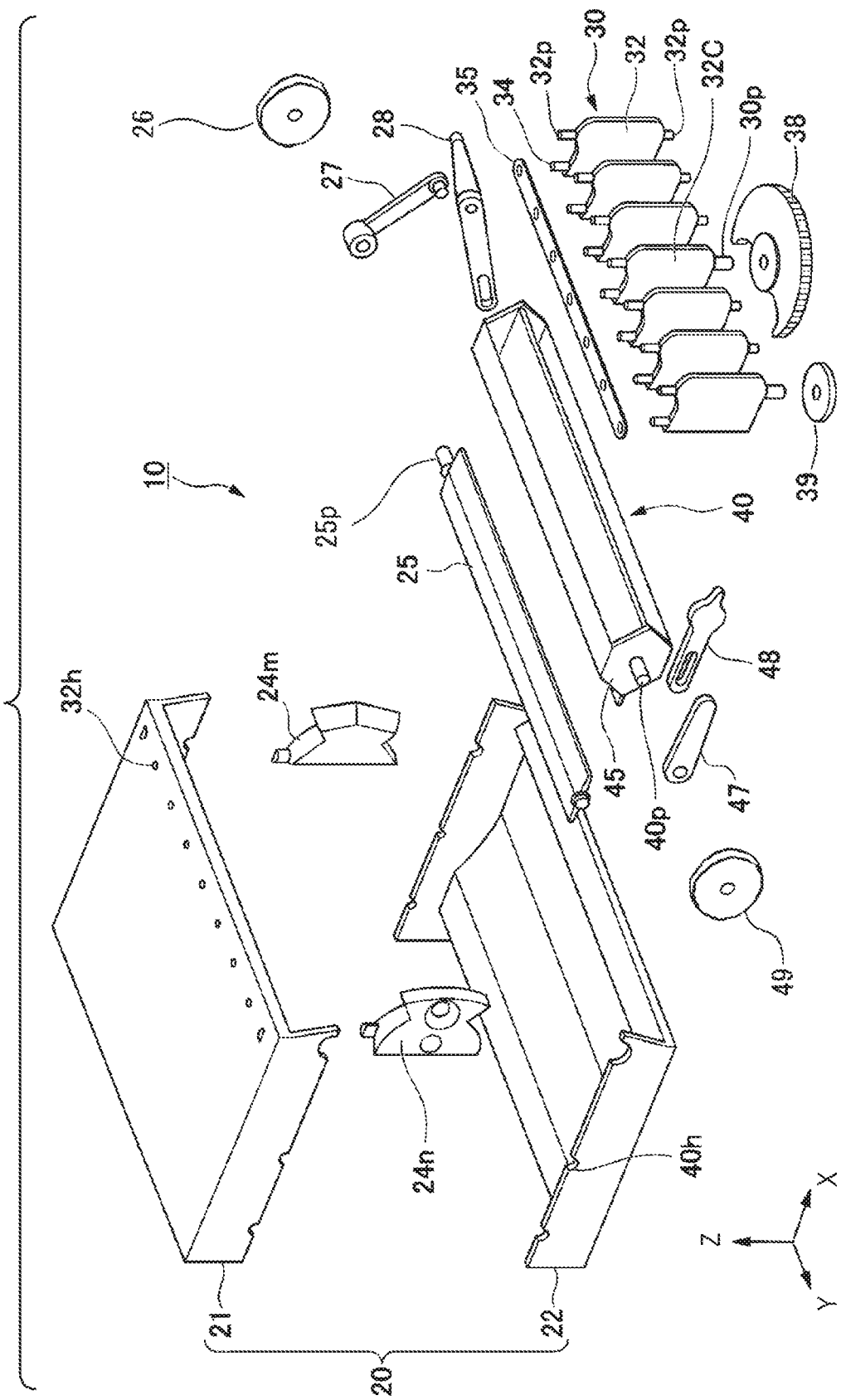
FIG. 3 is an exploded perspective view of the air blowing unit of the air conditioner according to the embodiment.

FIG. 3 is an exploded perspective view of the air blowing unit 10 pertaining to the embodiment. As illustrated in FIG. 3, the air blowing unit 10 includes a case 20, a shutoff valve 25 capable of adjusting the amount of air that is blown, a louver 30 for adjusting a horizontal-direction component of the wind direction, and a deflection fin 40 for adjusting a vertical-direction component of the wind direction. The members constituting the air blowing unit 10 are each made of a resin material, a metal material, or the like. The case 20 includes a first case 21, a second case 22, and link supporting portions 24m and 24n. The case 20 can be split into two in the Z direction. The first case 21 is arranged in the +Z direction and the second case 22 is arranged in the −Z direction. The link supporting portions 24m and 24n are sandwiched between the first case 21 and the second case 22. The link supporting portions 24m and 24n are arranged at two end portions in the Y direction.

The case 20 is connected to the air conditioner 3 of the vehicle via the duct 5 (see FIG. 2). An air passage for allowing the air from the duct 5 to flow toward the vent is formed inside the case 20. The air passing through the air passage is deflected in the direction in which the fin 40 is facing by passing through the fin 40, and is blown against inclined portions of the case 20 provided near the vent to further change its direction to follow the inclinations of the inclined portions. Accordingly, air is blown out upward from the vent if the fin 40 is facing downward along the air blowing direction and is blown out downward from the vent if the fin 40 is facing upward along the air blowing direction. Further, the louver 30 for deflecting the flow of air in the horizontal direction is provided in the vent, and the direction of the air that is blown out is changed to the direction in which the louver 30 is facing. Accordingly, air is blown in a direction in which the air is guided by the fin 40 and the louver 30. Further, the flow of air from the duct 5 can be regulated or shut off by using the shutoff valve 25.

Here, mechanisms for controlling the shutoff valve 25, the louver 30, and the fin 40 are described. As illustrated in FIG. 3, the shutoff valve 25 is formed to have the shape of a rectangular flat plate elongated in the Y direction. The shutoff valve 25 is rotatably supported by the case 20. A first link member 27 and a pulley 26 are connected in this order to a shaft 25p at a −Y direction end portion of the shutoff valve 25. A second link member 28 is rotatably supported by the link supporting portion 24m. If a +X direction end portion of the second link member 28 is moved in the Z direction, a +X direction end portion of the link member 27, which is slidably inserted into an elliptical hole provided in a −X direction end portion of the second link member 28, axially rotates. Accordingly, the shutoff valve 25, the shaft 25p of which is fixed to a −X direction end portion of the link member 27, rotates inside the case 20.

Further, the shutoff valve 25 also rotates inside the case 20 when the pulley 26 attached to the shaft 25p is rotated by a valve opening/closing motor 403 (see FIG. 4B) via an unillustrated belt. Accordingly, the shutoff valve 25 can be opened and closed or the shutoff valve 25 can be adjusted, and the wind amount can be thereby adjusted, in both a case in which the link member 28 is manually operated (this is referred to as a "manual adjustment") and a case in which the shutoff valve 25 is operated by the valve opening/closing motor 403 (this is referred to as an "automatic adjustment"). Here, for example, if the pulley 26 and the shaft 25p are not completely fixed to each other and are interposed by and attached to one another by a torque limiter that slips when a predetermined torque is exceeded, such as a clutch, both the manual adjustment and the automatic adjustment can be realized without placing an unnecessary load on the valve opening/closing motor 403.

The louver 30 includes a plurality of slats 32, a connection member 35, and a dial 38. The slats 32 are formed to have substantially rectangular plate shapes. The plurality of slats 32 are arranged parallel to each other and lined up in the Y direction. Rotation pins 32p are provided protruding from both Z direction end portions of each slat 32. The rotation pins 32p are inserted into holes 32h in the case 20. Accordingly, the slats 32 are rotatably supported by the case 20. A connection pin 34 is provided protruding from a +Z direction end portion of each slat 32 at a position distant from the rotation pin 32p. For example, the rotation pin 32p is disposed at a +X direction end portion, and the connection pin 34 is disposed away from the rotation pin 32p at a −X direction end portion. The connection member 35 is provided with a plurality of holes. The connection pins 34 of the plurality of slats 32 are inserted into the plurality of holes in the connection member 35. A center rotation pin 30p is provided protruding from the −Z direction end portion of a center slat 32C arranged at the center in the Y direction. The dial 38 is connected to the center rotation pin 30p of the center slat 32C. The center slat 32C rotates if the dial 38 is rotated. In synchronization with this, the plurality of slats 32, which are connected by the connection member 35, rotate. The louver 30 changes the Y direction wind direction of the wind blown out from the vent by rotating the slats 32.

Further, a pulley 39 is attached to the lower rotation pin 32p of the slat 32 at the left end in FIG. 3. The louver 30 also rotates when the pulley 39 is rotated by a louver motor 404 (see FIG. 4B) via an unillustrated belt. Accordingly, the direction of the louver 30 can be adjusted in both a case in which the dial 38 is manually operated (this is referred to as a "manual adjustment") and a case in which the louver 30 is operated by the louver motor 404 (this is referred to as an "automatic adjustment"). Here, for example, if the pulley 39 and the pin 32p are not completely fixed to each other and are interposed by and attached to one another by a torque limiter that slips when a predetermined torque is exceeded, such as a clutch, both the manual adjustment and the automatic adjustment can be realized without placing an unnecessary load on the louver motor 404 and also without changing the rotor phase of the louver motor 404. Hence, if the wind direction is adjusted to an undesired direction through automatic adjustment, the direction can be corrected through manual adjustment, for example. Once the air blowing direction has been manually corrected, the air blowing direction can be adjusted to a desired direction through automatic adjustment performed thereafter.

The fin 40 includes a plurality of blades. In this example, the blades of the fin 40 include three blades arranged lined up in the Z direction (a first direction). Each blade is formed to have the shape of a rectangular flat plate elongated in the Y direction. Rotation pins 40p are provided protruding from Y direction outer surfaces of end plates of the fin 40. The rotation pins 40p are inserted into holes 40h in the case 20. Accordingly, the fin 40 is rotatably supported by the case 20. A third link member 47 and a fourth link member 48, and also a pulley 49 are connected in this order to the +Y direction rotation pin 40p of the fin 40. The fourth link member 48 is rotatably supported by the link supporting portion 24n. The wind direction changing means 40 rotates inside the case 20 if a +X direction end portion of the fourth link member 48 is moved in the Z direction. The fin 40 changes the X direction wind direction of the wind blown from the vent by rotating.

Further, the fin 40 also rotates inside the case 20 when the pulley 49 attached to the rotation pin 40p is rotated by a fin motor 405 (see FIG. 4B) via an unillustrated belt. Accordingly, the direction of the fin 40 can be adjusted in both a case in which the fourth link member 48 is manually operated (this is referred to as a "manual adjustment") and a case in which the fin 40 is operated by the fin motor 405 (this is referred to as an "automatic adjustment"). Here, for example, if the pulley 49 and the rotation pin 40p are not completely fixed to each other and are interposed by and attached to one another by a torque limiter that slips when a predetermined torque is exceeded, such as a clutch, both the manual adjustment and the automatic adjustment can be realized without placing an unnecessary load on the fin motor 405 and also without changing the rotor phase of the fin motor 405. Hence, if the wind direction is adjusted to an undesired direction through automatic adjustment, the direction can be corrected through manual adjustment, for example. Once the air blowing direction has been manually corrected, the air blowing direction can be adjusted to a desired direction through automatic adjustment performed thereafter.

Control of Air Blowing Unit

Figure 4A:
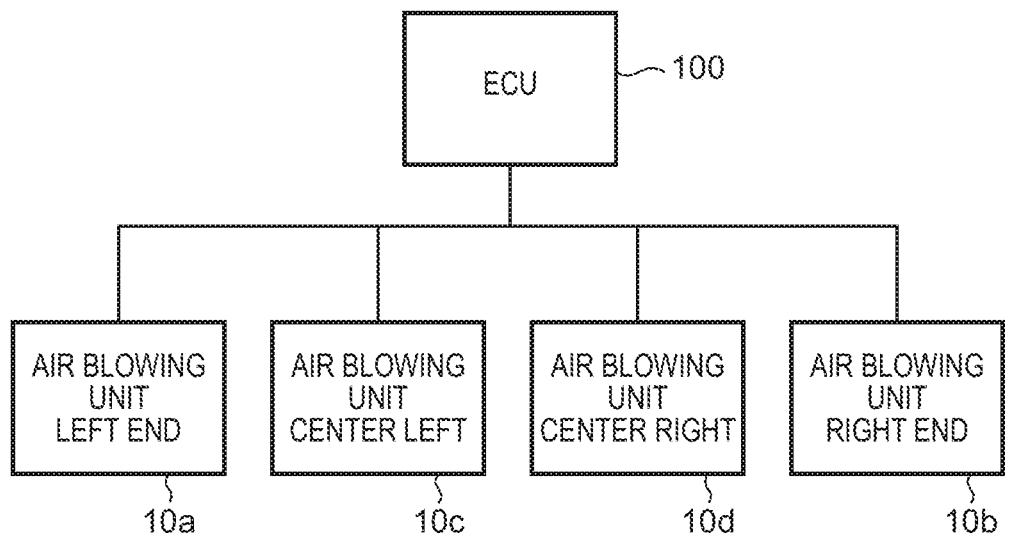
FIG. 4A is a block diagram of a control unit of the air conditioner according to the embodiment.
Figure 4B:
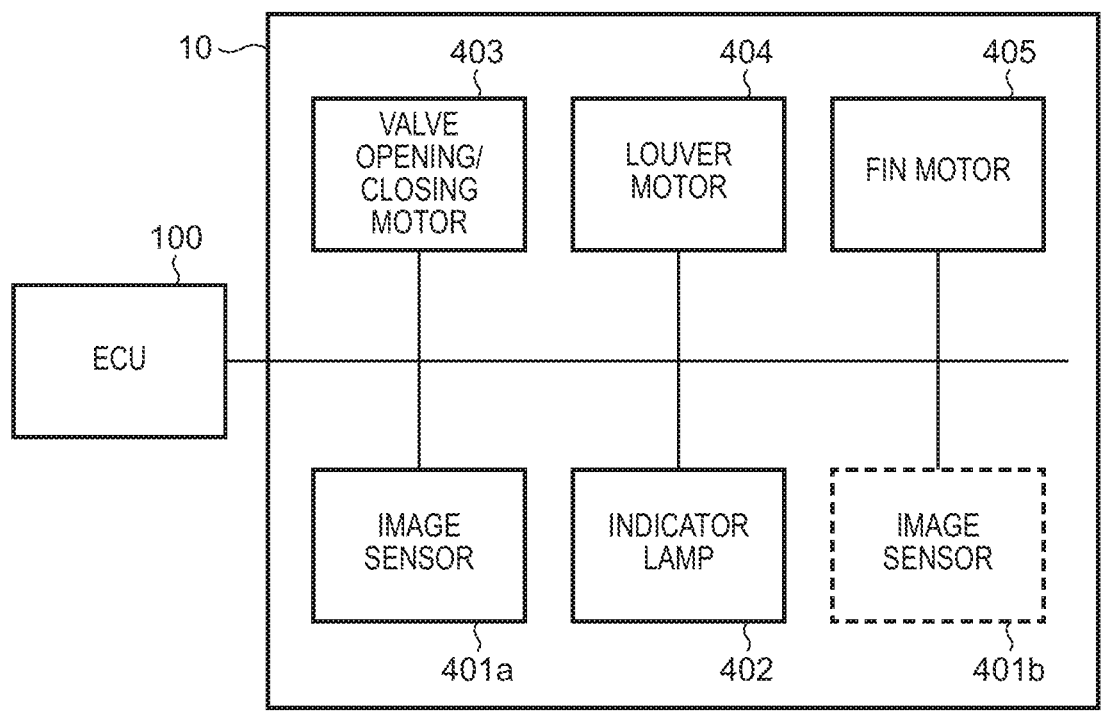
FIG. 4B is a block diagram of the control unit of the air conditioner according to the embodiment.

FIGS. 4A and 4B illustrate the control configuration of the air conditioner. While control relating to the temperature, wind direction, and wind amount is performed as control of the air conditioner for example, description is provided here with particular focus on the control of wind direction. Thus, a portion that, while constituting a part of the air conditioner, relates to the control of the wind direction may be referred to as a wind direction control device or an air blow control device.

FIG. 4A illustrates an ECU 100, which is a control unit that controls the air conditioner, and air blowing units 10 to be controlled by the ECU 100. The ECU 100 includes a processor and a memory, and controls the air blowing units 10a to 10d provided in the instrument panel 2 in the present example, as illustrated in FIG. 4A. The air blowing units 10 each have the same control configuration, which is illustrated in FIG. 4B. In FIG. 4B, the air blowing unit 10 includes an image sensor 401a such as a camera, for example, an indicator lamp 402, a valve opening/closing motor 403, a louver motor 404, and a fin motor 405. Note that an image sensor 401b is an option for forming a stereo camera in combination with the image sensor 401a, and is regarded as not being included in the present embodiment. These constituent elements are controlled by the ECU 100. Here, while each of the motors is described as being a pulse motor, other motors such as a direct current motor in which a rotary encoder is built into a rotor shaft may be used. Further, each image sensor 401 may be a visible light camera or an infrared image sensor. The infrared image sensor may be an infrared camera or an infrared array sensor, provided that the necessary resolution can be achieved. Needless to say, these are examples and other motors and sensors can also be used.

Figure 5:
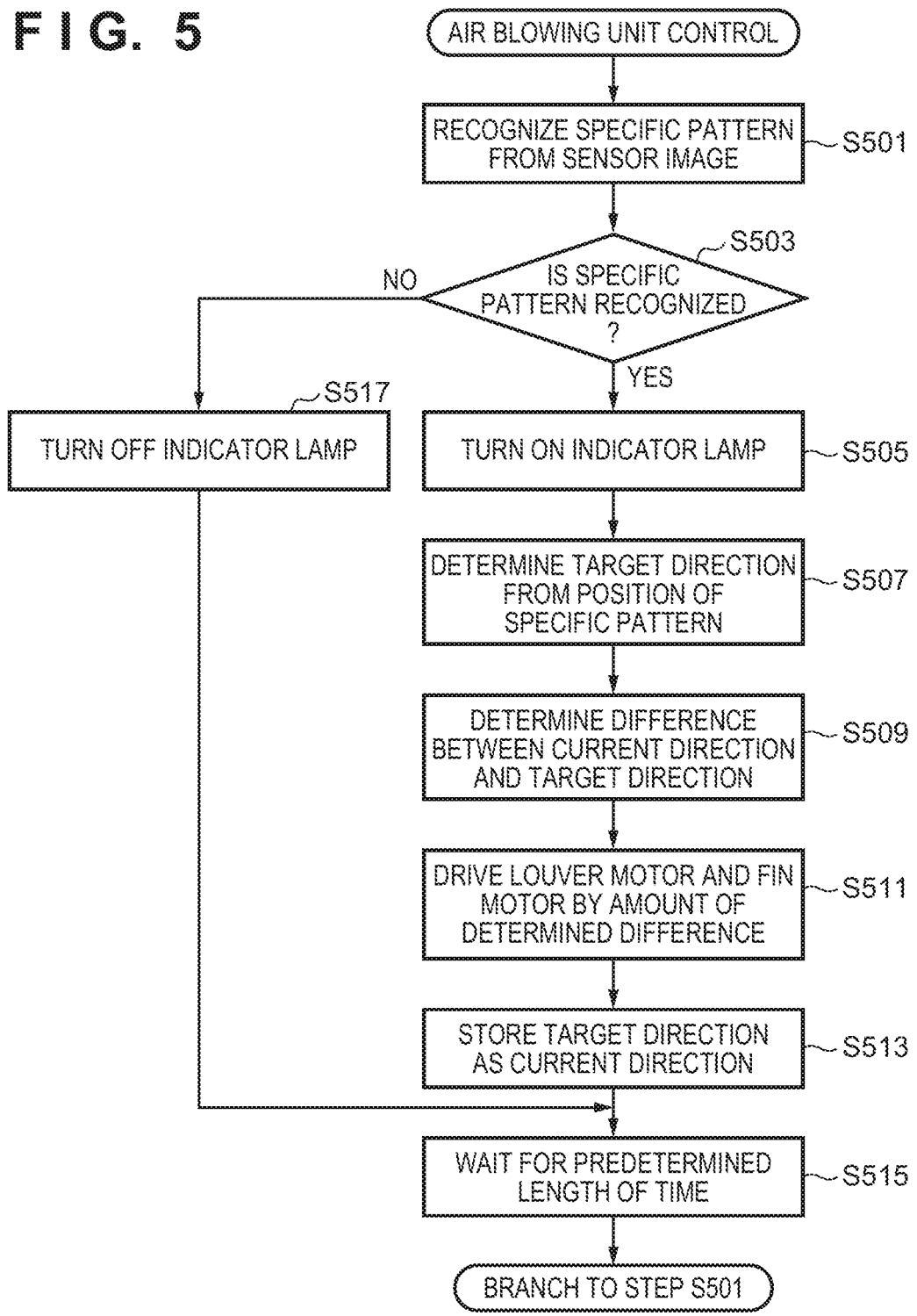
FIG. 5 is a flowchart illustrating a control procedure of the air blowing unit.

FIG. 5 illustrates a control procedure executed by the ECU 100 in the configuration illustrated in FIGS. 4A and 4B. This procedure is realized through the execution of a program stored in the memory built into the ECU 100, etc., for example. The procedure illustrated in FIG. 5 is for one air blowing unit 10, and the image sensor 401a that is used is the image sensor forming a pair with the air blowing unit 10 that is controlled. The procedure illustrated in FIG. 5 is executed for all of the air blowing units 10. Thus, the procedure illustrated in FIG. 5 may be executed in parallel for a plurality of the air blowing units 10. However, there are cases in which the specific pattern that is recognized varies depending on the position of the air blowing unit 10. This is because, with regard to the air blowing units 10c and 10d, the images acquired by the respective image sensors 401a of the air blowing units 10c and 10d may overlap with one another, and there is a need to determine which air blowing unit 10 is the operation target. In this example, the operation target is determined by varying the specific pattern.

First, the ECU 100 acquires a sensor image detected by the image sensor 401, and performs the recognition of a specific pattern from the sensor image (S501). In this example, it suffices for the specific pattern to be the shape of an open palm. In addition, whether the hand is the right hand or the left hand is also recognized. It suffices for the recognition of the right or left hand to be performed based on the assumption that the palm side is directed toward the image sensor 401a, for example. In other words, in step S501, shapes of the left and right hands, when they are open and directed toward the front of the vehicle, are recognized from the sensor image. Note that, whether the pattern to be recognized is the right hand or the left hand differs depending upon the air blowing unit. For example, the recognition target is the right hand for the air blowing unit 10c at the center left, and the recognition target is the left hand for the air blowing unit 10d at the center right. Further, with regard to the air blowing units 10a and 10b at the end portions, both the right hand and the left hand are recognized as specific patterns and it suffices if one of the left and right hands can be recognized. Thus, the image sensor 401 in this example needs to have a resolution high enough to enable a distinction between left and right hands. Note that, if a plurality of specific patterns are recognized in one frame image (also simply referred to as a frame), it suffices for one pattern among such patterns to be selected, as appropriate. For example, it suffices to select the pattern that is closest to the center of the frame, etc. Further, if pattern recognition is performed successively, the processing may proceed to the next step at the point in time where the specific pattern is recognized for the first time with the recognition being successful.

If the recognition of the specific pattern was successful (YES in S503), the indicator lamp 402 is turned on (S505).

Figure 6:
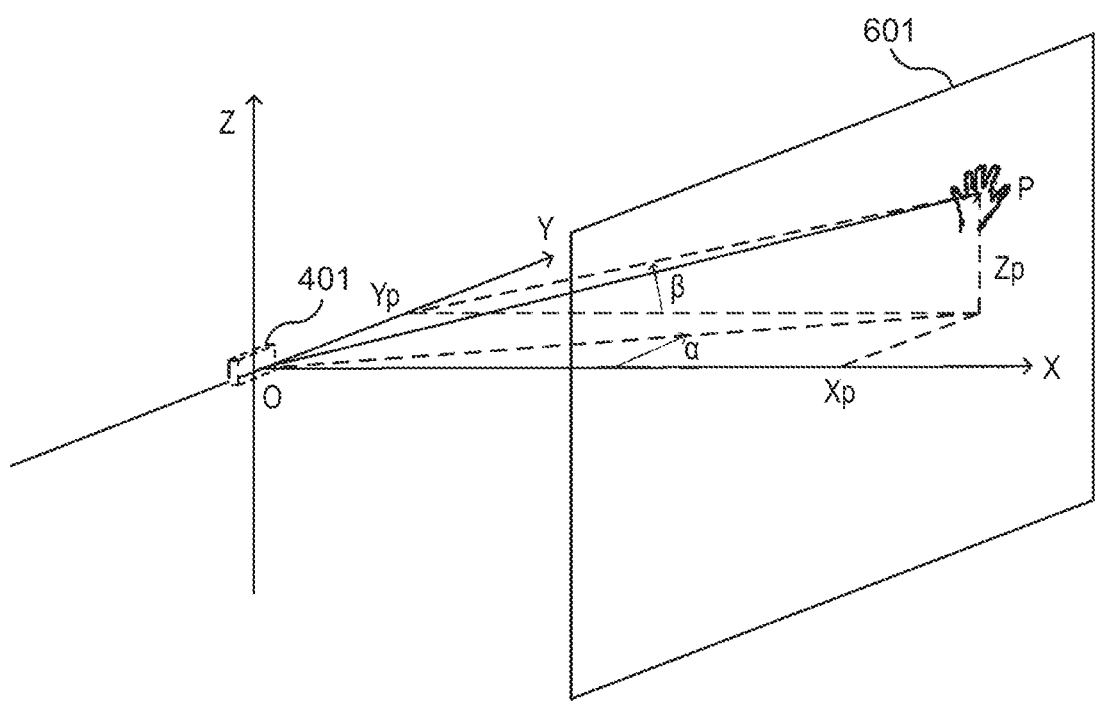
FIG. 6 illustrates an example of an air blowing direction from the air blowing unit.

Further, a target direction is determined from the position of the recognized specific pattern (S507). In this example, the direction of the specific pattern is determined as the target direction as-is. FIG. 6 illustrates one example of the relation between a sensor image and directions. Each image sensor 401 has a fixed focal length and acquires a frame 601 with a fixed angle of view. An open hand in this frame is recognized, and for example, the base of the middle finger of the recognized hand is determined as a position P of the specific pattern. Suppose that the position in the frame 601 is (Yp, Zp). Here, the width direction and the height direction of the frame are respectively indicated by the Y axis and the Z axis. If the image sensor 401 is installed facing rearward from the front of the vehicle, the Y axis and the Z axis respectively indicate the vehicle width direction and the height direction, and the X axis, which is perpendicular to these axes, indicates the front-rear direction. Here, it is possible to determine an azimuth angle α based on the X axis, which connects the image sensor 401 and the center of the frame 601, in accordance with the coordinate value Yp. Further, it is possible to determine an elevation angle β also based on the X axis, in accordance with the coordinate value Zp. It suffices to set the pair (α, β) of the azimuth and elevation angles as the direction of the specific pattern. Accordingly, in this example, the pair (α, β) of the azimuth and elevation angles is determined, as-is, as the target direction.

Next, the difference between the target direction determined in step S507 and the current air blowing direction that is stored (i.e., the previously-determined target direction) is determined (S509). It suffices to use (0, 0), for example, as the initial value of the current air blowing direction.

Then, control is performed so that the louver motor 404 and the fin motor 405 are driven by amounts corresponding to the difference determined in step S509 (S511). The difference in azimuth angle is adjusted by the louver motor 404, and the difference in elevation angle is adjusted by the fin motor 405. It suffices for the correlation between wind direction adjustment amounts and motor driving amounts to be measured in advance. It is not necessarily the case that the directions of the louver 30 and the fin 40 directly determine the wind direction. Accordingly, for each of the azimuth and elevation angles, the driving amount of the corresponding motor for changing the wind direction is measured and stored in advance. Further, the driving amounts of the motors are determined by mapping the calculated differences in the azimuth and elevation angles to the driving amounts of the respective motors. Then, control is performed so that the motors are driven by the determined driving amounts. Finally, the target direction determined in step S507 is preemptively stored as the previous target direction (S513).

This concludes one instance of control. After waiting for a predetermined length of time in step S515, the control is repeated from step S501. For example, when the image sensor 401 has a very high frame rate, this predetermined length of time may be set so that frames are skipped at a certain rate. When the frame rate is not particularly high, it suffices for the predetermined length of time to be the length of time until the next succeeding frame is acquired.

On the other hand, if the specific pattern was not recognized from the processing target frame in step S503 (NO in S503), the indicator lamp 402 is turned off (S517). Note that the indicator lamp 402 remains turned on in the case where turning on thereof is repeated and remains turned off in the case where turning off is repeated. Accordingly, a passenger can be informed of the completion of automatic adjustment, as a result of the indicator lamp being turned off once the specific pattern can no longer be recognized.

In the present embodiment, a sensor is made to recognize an open hand, for example, as the specific pattern, and the wind direction control device is controlled so as to blow air in the direction of the specific pattern, as described above. Thus, the operation for adjustment is intuitive, and a situation in which the operation method is confused with another method or is forgotten can be prevented. Further, a desired direction can be easily designated by the direction of the hand being set as the air blowing direction. Further, the operator can be aware that the operation for adjustment is in progress due to a lamp being turned on while the wind direction is being adjusted.

Second Embodiment

The second embodiment further includes the image sensor 401b and has a structure in which the image sensors are used in a stereo configuration. By using the image sensors in a stereo configuration, not only can a specific pattern be recognized from a frame, but also, the position in a three-dimensional space of a target object recognized as the specific pattern can be determined from the parallax between the specific patterns recognized by the respective image sensors and the distance between the image sensors 401a and 401b (referred to hereinafter as a "base length"). Accordingly, the three-dimensional position of the target object and the distance from an image sensor 401 to the target object can be used as parameters for controlling the wind direction control device. Further, even if the image sensor 401 and an air blowing unit 10 are distant from one another, the target direction can be determined based on the air blowing unit 10. In the following description, description regarding portions in common with the first embodiment is omitted. Further, the coordinate system referred to in the description is in accordance with FIG. 6.

For example, suppose that the azimuth angle of the direction (referred to hereinafter as a target direction) of a specific pattern from the image sensor 401a, of the image sensors 401a and 401b arranged apart from one another by a base length L in the vehicle width direction (i.e., the Y direction in FIG. 6), is α1, and the azimuth angle of the target direction from the image sensor 401b is α2. There is no difference in the height-direction positions of these sensors, and thus, the elevation angle is β for both sensors (while there is an extremely small difference corresponding to the distance, the difference can be considered practically small enough compared to the difference between the azimuth angles and thus is ignored here). Based on this, suppose for example that the length when a distance Lp from the image sensor 401a to an object P (referred to hereinafter as a specific object) corresponding to the specific pattern is projected on the X axis is Xp, and the length when the distance Lp is projected on the Y axis is Yp. The relations between these values are as expressed in the following expressions.

$$\tan(\alpha 1) = Yp/Xp$$

$$\tan(\alpha 2) = (L+Yp)/Xp$$

Accordingly, the following holds true.

$$\tan(\alpha 2) - \tan(\alpha 1) = L/Xp$$

$$Xp = L/(\tan(\alpha 2) - \tan(\alpha 1))$$

$$Yp = \tan(\alpha 1) \cdot Xp$$
$$= L \cdot \tan(\alpha 1)/(\tan(\alpha 2) - \tan(\alpha 1))$$

Further, the distance Zp when Lp is projected on the Z axis satisfies the following relation: $\tan(\beta)=Zp/Xp$. Accordingly, the following holds true.

$$Zp = Xp \cdot \tan(\beta)$$
$$= L \cdot \tan(\beta)/(\tan(\alpha 2) - \tan(\alpha 1))$$

The coordinates (Xp, Yp, Zp) acquired in such a manner are the coordinates of the specific object P.

The target direction from an air blowing unit 10 to the specific object P, i.e., the azimuth and elevation angles from an air blowing unit 10 to the specific object P, can be determined, for example, by converting these coordinates (Xp, Yp, Zp), which are based on the image sensor 401*a*, into a coordinate system in which the air blowing unit 10 is set as the origin and following a procedure that is the reverse of the above-described expressions. Accordingly, for example, even if there is only a pair of image sensors 401*a* and 401*b* for the air blowing units 10*c* and 10*d* at the center, the target direction of the specific object P from each of the air blowing units 10*c* and 10*d* can be determined by using the single pair of image sensors.

Further, by providing the image sensors 401*a* and 401*b* in each air blowing unit 10, the distance of the specific object (a hand in this example) from the air blowing unit 10 can be determined. Accordingly, operation of the air blowing unit 10 in which this distance is used as a parameter can also be performed. For example, the operation of moving the hand toward the air blowing unit 10 may be set as the operation for closing the shutoff valve 25 and the operation of moving the hand away from the air blowing unit 10 may be set as the operation for opening the shutoff valve 25. In this case, if the ECU 100 recognizes the specific pattern from a sensor image, the ECU 100 determines the distance of the specific pattern in addition to the position of the specific pattern in step S507 in FIG. 5. Further, in step S509, the ECU 100 calculates a difference between a previously-determined distance and the currently-determined distance, and integrates the calculated difference in distance, in addition to determining the difference in direction. In step S511, the ECU 100, in addition to driving the louver motor and the fin motor, controls the valve opening/closing motor 403 and opens or closes the shutoff valve 25 if the integrated difference in distance exceeds a predetermined threshold value. In this example, the angular difference between a completely-open state and a completely-closed state of the shutoff valve 25 is 90 degrees. Accordingly, this angular difference is quartered, and 22.5 degrees is set as the unit of adjustment. For example, the ECU 100 controls the valve opening/closing motor 403 so as to rotate the shutoff valve 25 in the closing direction by 22.5 degrees if the distance of the specific object moves closer by 10 cm and to rotate the shutoff valve 25 in the opening direction by 22.5 degrees if the distance of the specific object, conversely, moves away by 10 cm. Further, in step S517, the ECU 100 resets the integrated difference in distance to zero, in addition to turning off the indicator lamp.

According to the present embodiment, by using the image sensors in a stereo configuration, not only the direction of the specific pattern but also three-dimensional coordinates of a corresponding object can be determined, and the distance to the recognized object from an arbitrarily-defined location in the vehicle cabin can also be determined, as described above. Further, by using the distance as a parameter, further operation of an air blow control device can be made with regard to the shutoff valve or the like, for example.

Hence, the air conditioner can be operated intuitively. Further, if a driver is in a hands-off state in an automated driving vehicle for example, even the driver can take a relatively free driving posture and can also sit at a position away from the steering wheel. In such a case, if operation portions are provided in the instrument panel, the driver would need to change his/her posture every time he/she operates an operation portion. However, in the two embodiments described above, the wind direction can be adjusted by merely directing a palm toward an image sensor and moving the palm to a desired position.

Further, each air blowing unit 10 is provided with an image sensor 401*a* in the first embodiment. However, in the second embodiment, only one pair of image sensors may be provided, as long as the operation-target air blowing unit 10 can be determined. For example, in place of an open hand, a hand with a predetermined number of fingers outstretched is used as the specific pattern. A plurality of air blowing units can be operated by using one pair of image sensors (one stereo camera) if a configuration is employed such that the operation-target air blowing unit is specified based on the number of fingers outstretched. For example, if a pattern with two fingers raised (a pattern in which the alphabetical character "V" is formed by the index and middle fingers) is recognized, control is performed as in the first or second embodiment with the air blowing unit associated with the pattern in advance as the operation target. By employing such a configuration, even if costly image sensors with high resolution are used, the number of image sensors used can be suppressed because a plurality of air blowing units can be controlled by using one pair of image sensors. Further, while it is the wind amount that is adjusted based on the distance to a hand in the present embodiment, a configuration may be made in which adjustment of other settings, such as temperature adjustment and the adjustment of the rotation intensity of a blower fan of the air conditioner, for example, is performed.

Note that the technical scope of the present invention is not limited to the above-described embodiments, and includes the above-described embodiments modified in various ways without departing from the essence of the present invention. In other words, the configurations in the above-described embodiments are mere examples and can be modified as appropriate.

SUMMARY OF EMBODIMENTS

The above-described embodiments can be summarized as follows.

(1) According to a first aspect of the present invention, the present invention is a wind direction control device includes:

a detector configured to (for example, the image sensors 401) detect a hand;

a wind direction adjustment unit configured to (for example, the louver motor 404, the louver 30, the fin motor 405, and the fin 40) adjust an air blowing direction of an air conditioner; and a controller configured to (for example, the ECU 100) control the wind direction adjustment unit so that a direction of the hand detected by the detector is set as the air blowing direction.

With this configuration, the air blowing direction of the air conditioner can be adjusted remotely and as desired through an intuitive operation.

(2) According to a second aspect of the present invention, the present invention is the wind direction control device according to (1), further including:

an illuminator (for example, the indicator lamp 402), wherein the controller turns on the illuminator while the wind direction adjustment unit adjusts the air blowing direction.

With this configuration, an operator can be visually informed that the adjustment is in progress.

(3) According to a third aspect of the present invention, the present invention is the wind direction control device according to (1), wherein the wind direction adjustment unit adjusts an air blowing direction from each of two vents (for example, the air blowing units 10c and 10d) provided at a central part of a vehicle cabin in a vehicle width direction, and the controller, for one of the vents, controls the wind direction adjustment unit and adjusts the air blowing direction if a right hand is detected by the detection unit, and for the other one of the vents, controls the wind direction adjustment unit and adjusts the air blowing direction if a left hand is detected by the detection unit.

With this configuration, even when a plurality of wind direction adjustment means are installed close to one another, the plurality of wind direction adjustment means can be selectively operated.

(4) According to a fourth aspect of the present invention, the present invention is the wind direction control device according to (3), wherein the two vents are disposed side by side in the vehicle width direction, and the controller, for one of the two vents that is located on the left side facing forward of the vehicle, controls the wind direction adjustment unit and adjusts the air blowing direction if a right hand is detected by the detector, and for the other one of the vents, which is located on the right side facing forward of the vehicle, controls the wind direction adjustment unit and adjusts the air blowing direction if a left hand is detected by the detection unit.

With this configuration, operability improves because wind direction can be controlled by using the hand closer to each vent.

(5) According to a fifth aspect of the present invention, the present invention is the wind direction control device according to (1), wherein the wind direction adjustment unit adjusts an air blowing direction from each of two vents (e.g., the air blowing units 10a and 10b) provided at two end portions of a vehicle cabin in a vehicle width direction, and the controller, for either of the two vents provided at the two end portions in the vehicle width direction, controls the wind direction adjustment unit and adjusts the air blowing direction if either one of a left hand or a right hand is detected by the detector.

With this configuration, operability is improved because either hand can be used for operating the vents at two end portions.

(6) According to a sixth aspect of the present invention, the present invention is the wind direction control device according to (1) further including:

a manual adjustment unit configured to (for example, the link members 28 and 48) manually adjust the air blowing direction.

With this configuration, operability is improved because manual adjustment can be performed in addition to automatic adjustment.

(7) According to a seventh aspect of the present invention, the present invention is the wind direction control device according to (6), wherein the manual adjustment unit adjusts a deviation between the direction of the hand detected by the detector and a wind direction after the adjustment by the wind direction adjustment unit.

With this configuration, the error resulting from the automatic adjustment can be corrected by performing the manual adjustment.

(8) According to an eighth aspect of the present invention, the present invention is the wind direction control device according to (1), wherein the detector (e.g., the image sensors 401a and 401b) further detects a distance to the hand, and the controller determines a position of the hand in a three-dimensional space based on the direction and the distance of the hand detected by the detector and controls the wind direction adjustment unit so that a direction of the position is set as the air blowing direction.

With this configuration, wind direction can be adjusted even if the wind direction adjustment means and the detection means are distant from one another.

(9) According to a ninth aspect of the present invention, the present invention is the wind direction control device according to (8), further including:

a wind amount adjustment unit configured to (e.g., the valve opening/closing motor 403 and the shutoff valve 25) adjust a wind amount of the air conditioner, wherein the controller adjusts the wind amount adjustment unit so that a wind amount that corresponds to a distance between the position of the wind direction adjustment unit and the position of the hand detected by the detector in the three-dimensional space is set.

With this configuration, wind amount can also be adjusted intuitively.

The present invention is not limited to the above-described embodiments, and various modifications and changes can be made without departing from the spirit and scope of the present invention. The following claims are therefore appended to disclose the scope of the present invention.

What is claimed is:

1. A wind direction control device comprising:
a detector configured to detect a direction of a hand from the detector;
a wind direction adjustment unit having fins, a louver arranged orthogonally to the fins, and motors to move the fins and the louver to adjust an air blowing direction from each of two vents; and
a controller configured to control the wind direction adjustment unit so that the direction of the hand detected by the detector is set as the air blowing direction,
wherein the controller, for one of the two vents, controls the wind direction adjustment unit and adjusts the air blowing direction if a right hand is detected by the detection unit, and for the other one of the two vents, controls the wind direction adjustment unit and adjusts the air blowing direction if a left hand is detected by the detection unit.

2. The wind direction control device according to claim 1, further comprising:
   an illuminator,
   wherein the controller turns on the illuminator while the wind direction adjustment unit adjusts the air blowing direction.

3. The wind direction control device according to claim 1, wherein
   the two vents are provided in a vehicle cabin in a vehicle width direction.

4. The wind direction control device according to claim 3, wherein
   the two vents are disposed side by side in the vehicle width direction, and
   the controller, for one of the two vents that is located on the left side facing forward of the vehicle, controls the wind direction adjustment unit and adjusts the air blowing direction if the right hand is detected by the detector, and for the other one of the two vents, which is located on the right side facing forward of the vehicle, controls the wind direction adjustment unit and adjusts the air blowing direction if the left hand is detected by the detection unit.

5. The wind direction control device according to claim 1, wherein
   the wind direction adjustment unit is configured to adjust the air blowing direction from each of the two vents provided at two end portions of the vehicle cabin in a vehicle width direction, and
   the controller, for either of the two vents provided at the two end portions in the vehicle width direction, controls the wind direction adjustment unit and adjusts the air blowing direction if either one of the left hand or the right hand is detected by the detector.

6. The wind direction control device according to claim 1, further comprising:
   a manual adjustment unit configured to manually adjust the air blowing direction.

7. The wind direction control device according to claim 6, wherein
   the manual adjustment unit adjusts a deviation between the direction of at least one of the left hand and the right hand detected by the detector and a wind direction after the adjustment by the wind direction adjustment unit.

8. The wind direction control device according to claim 1, wherein
   the detector further detects a distance of at least one of the left hand and the right hand from the detector, and
   the controller determines a position of the at least one of the left hand and the right hand in a three-dimensional space based on the direction and the distance of the at least one of the left hand and the right hand detected by the detector and controls the wind direction adjustment unit so that the position of the at least one of the left hand and the right hand is set as the air blowing direction.

9. The wind direction control device according to claim 8, wherein
   the wind amount adjustment unit is configured to adjust a wind amount of each of the two vents,
   wherein the controller adjusts the wind amount adjustment unit so that the wind amount that corresponds to a distance between the position of the wind direction adjustment unit and the position of the at least one of the left hand and the right hand detected by the detector in the three-dimensional space is set.

* * * * *